(12) United States Patent
Hirakawa

(10) Patent No.: US 8,085,455 B2
(45) Date of Patent: Dec. 27, 2011

(54) OPTICAL SCANNING DEVICE, METHOD OF ADJUSTING THE SAME, AND IMAGE FORMING APPARATUS

(75) Inventor: Makoto Hirakawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 303 days.

(21) Appl. No.: 12/575,954

(22) Filed: Oct. 8, 2009

(65) Prior Publication Data

US 2010/0097679 A1    Apr. 22, 2010

(30) Foreign Application Priority Data

Oct. 16, 2008    (JP) .................................. 2008-266938

(51) Int. Cl.
*G02B 26/08* (2006.01)

(52) U.S. Cl. .................................................. 359/201.1

(58) Field of Classification Search ............... 359/201.1, 359/205.1–207.1
See application file for complete search history.

(56) References Cited

U.S. PATENT DOCUMENTS

| | | | |
|---|---|---|---|
| 5,657,146 A * | 8/1997 | Choi et al. ................. | 359/205.1 |
| 5,818,505 A | 10/1998 | Kato | |
| 6,256,133 B1 | 7/2001 | Suzuki et al. | |
| 6,804,064 B2 | 10/2004 | Hirakawa | |
| 6,829,102 B2 | 12/2004 | Ohashi et al. | |
| 6,850,350 B2 * | 2/2005 | Kawabata et al. ......... | 359/205.1 |
| 6,961,164 B2 * | 11/2005 | Atsuumi .................... | 359/201.1 |
| 7,385,181 B2 | 6/2008 | Miyatake et al. | |
| 2007/0002417 A1 | 1/2007 | Hirakawa et al. | |
| 2007/0030538 A1 | 2/2007 | Hirakawa et al. | |
| 2008/0158331 A1 | 7/2008 | Kato | |
| 2008/0180772 A1 | 7/2008 | Miyatake et al. | |
| 2008/0266633 A1 | 10/2008 | Hirakawa et al. | |
| 2008/0267663 A1 | 10/2008 | Ichii et al. | |
| 2009/0060582 A1 | 3/2009 | Ichii et al. | |
| 2009/0195849 A1 | 8/2009 | Ichii et al. | |
| 2009/0214261 A1 | 8/2009 | Hirakawa et al. | |

FOREIGN PATENT DOCUMENTS

| | | |
|---|---|---|
| JP | 2000-9994 A | 1/2000 |
| JP | 2002-287055 A | 10/2002 |
| JP | 3445050 B2 | 6/2003 |
| JP | 2005-338865 A | 12/2005 |
| JP | 3768734 B2 | 2/2006 |
| JP | 2009-80457 A | 4/2009 |

* cited by examiner

*Primary Examiner* — Euncha Cherry
(74) *Attorney, Agent, or Firm* — Dickstein Shapiro LLP

(57) ABSTRACT

A coupling optical system couples a light beam emitted from a light source that includes a two-dimensional array of light-emitting elements, including a first optical element having a positive power and a second optical element that has a negative power and receives the light beam passed through the first optical element. An incident surface and an output surface of the second optical element are concave. An absolute value of a paraxial curvature radius of the incident surface is larger than that of the output surface. A scanning optical system focuses the light beam that passed through the coupling optical system and deflected by a deflector on the target surface.

13 Claims, 14 Drawing Sheets

| | | R (mm) | | D (mm) | n | P (=1/f) |
|---|---|---|---|---|---|---|
| | | $R_y$ | $R_z$ | | | |
| 15a | LIGHT INCIDENT SURFACE | ∞ | ∞ | D1=5 | 1.5111 | 0.0242 |
| | LIGHT EMITTING SURFACE | −21.131 | −21.131 | D2=12 | AIR | |
| 15b | LIGHT INCIDENT SURFACE | −475.0 | −475.0 | D3=2 | 1.5239 | −0.00285 |
| | LIGHT EMITTING SURFACE | 300 | 300 | | | |

| | |
|---|---|
| $R_y$ | 300 |
| $R_z$ | 300 |
| K | 0 |
| $A_4$ | $9.796 \times 10^{-6}$ |
| $A_6$ | $6.300 \times 10^{-9}$ |

FIG. 10

| | R [mm] | | n |
|---|---|---|---|
| | $R_y$ | $R_z$ | |
| 17 LIGHT INCIDENT SURFACE | ∞ | 28.453 | 1.5111 |
| 17 LIGHT EMITTING SURFACE | ∞ | ∞ | AIR |

FIG. 11

| | DEFLECTOR-SIDE SCANNING LENS | |
|---|---|---|
| | LIGHT INCIDENT SURFACE | LIGHT EMITTING SURFACE |
| $R_y$ | −125.930 | −60.678 |
| K | 0 | 0 |
| $A_4$ | $6.914 \times 10^{-7}$ | $7.942 \times 10^{-7}$ |
| $A_6$ | $-1.174 \times 10^{-10}$ | $8.104 \times 10^{-11}$ |
| $A_8$ | $-7.595 \times 10^{-14}$ | $-4.464 \times 10^{-14}$ |
| $A_{10}$ | $4.989 \times 10^{-17}$ | $6.785 \times 10^{-18}$ |
| $A_{12}$ | $-7.994 \times 10^{-21}$ | $4.186 \times 10^{-21}$ |
| $R_z$ | −500.000 | −550.000 |
| $B_1$ | − | $9.489 \times 10^{-6}$ |
| $B_2$ | − | $-4.042 \times 10^{-6}$ |
| $B_3$ | − | $7.831 \times 10^{-9}$ |
| $B_4$ | − | $-2.329 \times 10^{-9}$ |
| $B_5$ | − | $-1.275 \times 10^{-11}$ |
| $B_6$ | − | $1.226 \times 10^{-12}$ |
| $B_7$ | − | $2.554 \times 10^{-15}$ |
| $B_8$ | − | $4.461 \times 10^{-16}$ |
| $B_9$ | − | $6.681 \times 10^{-19}$ |
| $B_{10}$ | − | $-1.678 \times 10^{-19}$ |

FIG. 12

| | IMAGE-PLANE-SIDE SCANNING LENS | |
|---|---|---|
| | LIGHT INCIDENT SURFACE | LIGHT EMITTING SURFACE |
| $R_y$ | −10000.000 | 520.144 |
| K | 0 | 0 |
| $A_4$ | $3.297 \times 10^{-7}$ | $1.272 \times 10^{-7}$ |
| $A_6$ | $-7.123 \times 10^{-11}$ | $-4.627 \times 10^{-11}$ |
| $A_8$ | $6.283 \times 10^{-15}$ | $4.048 \times 10^{-15}$ |
| $A_{10}$ | $-2.721 \times 10^{-19}$ | $-1.658 \times 10^{-19}$ |
| $A_{12}$ | $4.694 \times 10^{-24}$ | $2.589 \times 10^{-24}$ |
| $R_z$ | 268.018 | −44.257 |
| $B_1$ | $1.922 \times 10^{-6}$ | − |
| $B_2$ | $-9.735 \times 10^{-7}$ | $3.270 \times 10^{-7}$ |
| $B_3$ | $2.786 \times 10^{-10}$ | − |
| $B_4$ | $8.000 \times 10^{-11}$ | − |
| $B_5$ | $-8.279 \times 10^{-14}$ | − |
| $B_6$ | $1.166 \times 10^{-14}$ | − |
| $B_7$ | $8.548 \times 10^{-18}$ | − |
| $B_8$ | $-1.736 \times 10^{-18}$ | − |
| $B_9$ | $-3.040 \times 10^{-22}$ | − |
| $B_{10}$ | $6.410 \times 10^{-23}$ | − |

| d1 | d2 | d3 | d4 | d5 | DISTANCE BETWEEN CYLINDRICAL LENS AND POLYGON MIRROR |
|---|---|---|---|---|---|
| 43.70 | 12.00 | 12.20 | 69.99 | 3.00 | 56.20 |

| d6 | d7 | d8 | d9 | d10 | |
|---|---|---|---|---|---|
| 47.43 | 14.00 | 89.34 | 3.50 | 144.47 | UNIT: mm |

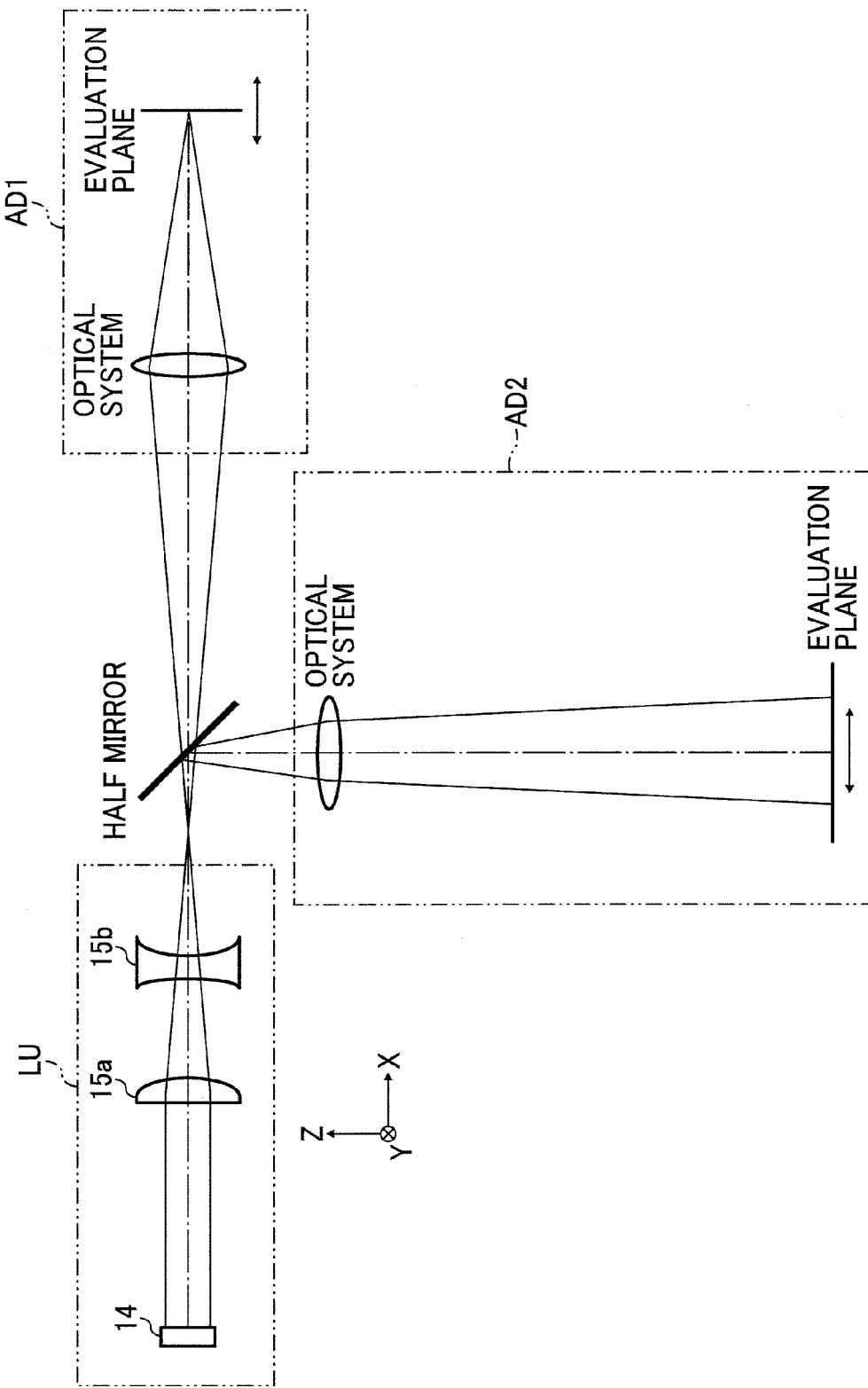

FIG. 17A
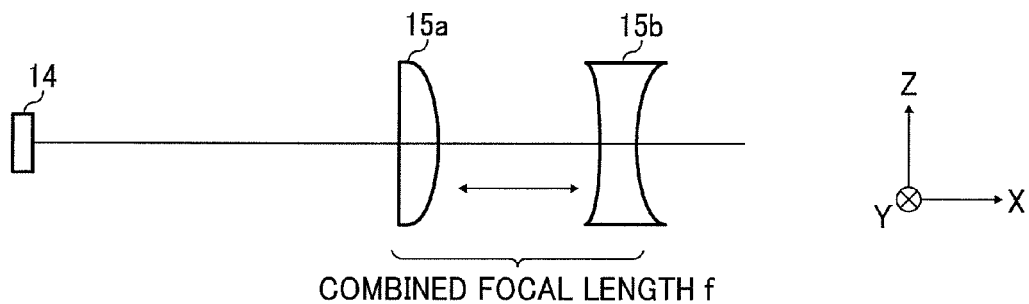
COMBINED FOCAL LENGTH f
FIG. 17B
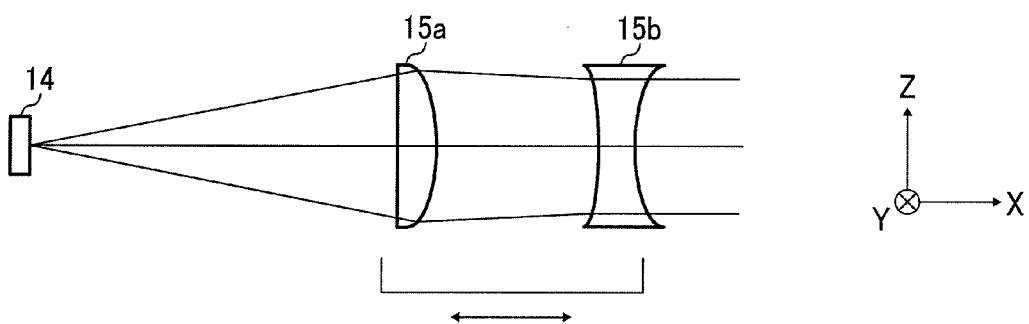
FIG. 18
|  |  | R (mm) | | D (mm) | n | P (=1/f) |
|---|---|---|---|---|---|---|
|  |  | $R_y$ | $R_z$ |  |  |  |
| 15a | LIGHT INCIDENT SURFACE | ∞ | ∞ | D1=5 | 1.5111 | 0.0242 |
|  | LIGHT EMITTING SURFACE | -21.163 | -21.163 | D2=12 | AIR |  |
| 15b | LIGHT INCIDENT SURFACE | -1000.0 | -1000.0 | D3=2 | 1.5239 | -0.00337 |
|  | LIGHT EMITTING SURFACE | 184 | 184 |  |  |  |

FIG. 19

| | |
|---|---|
| $R_y$ | 184.000 |
| $R_z$ | 184.000 |
| K | 0 |
| $A_4$ | $8.952 \times 10^{-6}$ |
| $A_6$ | $1.615 \times 10^{-7}$ |

FIG. 20

| | DEFLECTOR-SIDE SCANNING LENS | |
|---|---|---|
| | LIGHT INCIDENT SURFACE | LIGHT EMITTING SURFACE |
| $R_y$ | −279.876 | −83.588 |
| K | 0 | $-5.492 \times 10^{-1}$ |
| $A_4$ | $1.756 \times 10^{-7}$ | $2.748 \times 10^{-7}$ |
| $A_6$ | $-5.492 \times 10^{-11}$ | $-4.502 \times 10^{-12}$ |
| $A_8$ | $1.088 \times 10^{-14}$ | $-7.366 \times 10^{-15}$ |
| $A_{10}$ | $-3.183 \times 10^{-19}$ | $1.803 \times 10^{-18}$ |
| $A_{12}$ | $-2.635 \times 10^{-24}$ | $2.728 \times 10^{-23}$ |
| $R_z$ | −61.000 | − |
| $B_1$ | $-2.066 \times 10^{-6}$ | − |
| $B_2$ | $5.728 \times 10^{-6}$ | − |
| $B_3$ | $3.152 \times 10^{-8}$ | − |
| $B_4$ | $2.280 \times 10^{-9}$ | − |
| $B_5$ | $-3.730 \times 10^{-11}$ | − |
| $B_6$ | $-3.283 \times 10^{-12}$ | − |
| $B_7$ | $1.766 \times 10^{-14}$ | − |
| $B_8$ | $1.373 \times 10^{-15}$ | − |
| $B_9$ | $-2.890 \times 10^{-18}$ | − |
| $B_{10}$ | $-1.985 \times 10^{-19}$ | − |

FIG. 21

| | IMAGE-PLANE-SIDE SCANNING LENS | |
|---|---|---|
| | LIGHT INCIDENT SURFACE | LIGHT EMITTING SURFACE |
| $R_y$ | 6950.000 | 765.951 |
| K | 0 | 0 |
| $A_4$ | $1.550 \times 10^{-8}$ | $-1.150 \times 10^{-7}$ |
| $A_6$ | $1.293 \times 10^{-14}$ | $1.097 \times 10^{-11}$ |
| $A_8$ | $-8.811 \times 10^{-18}$ | $-6.542 \times 10^{-16}$ |
| $A_{10}$ | $-9.182 \times 10^{-22}$ | $1.984 \times 10^{-20}$ |
| $A_{12}$ | 0 | $-2.412 \times 10^{-25}$ |
| $R_z$ | 110.907 | −68.224 |
| $B_1$ | $-9.594 \times 10^{-7}$ | – |
| $B_2$ | $-2.135 \times 10^{-7}$ | $3.644 \times 10^{-7}$ |
| $B_3$ | $-8.080 \times 10^{-12}$ | – |
| $B_4$ | $2.391 \times 10^{-12}$ | $-4.847 \times 10^{-13}$ |
| $B_5$ | $2.881 \times 10^{-14}$ | – |
| $B_6$ | $3.694 \times 10^{-15}$ | $-1.666 \times 10^{-16}$ |
| $B_7$ | $-3.259 \times 10^{-18}$ | – |
| $B_8$ | $1.814 \times 10^{-20}$ | $4.535 \times 10^{-19}$ |
| $B_9$ | $8.722 \times 10^{-23}$ | – |
| $B_{10}$ | $-1.341 \times 10^{-23}$ | $-2.819 \times 10^{-23}$ |

FIG. 22

| d1 | d2 | d3 | d4 | d5 | DISTANCE BETWEEN CYLINDRICAL LENS AND POLYGON MIRROR |
|---|---|---|---|---|---|
| 43.76 | 19.00 | 12.14 | 69.99 | 3.00 | 56.20 |

| d6 | d7 | d8 | d9 | d10 |
|---|---|---|---|---|
| 63.27 | 22.59 | 75.86 | 4.90 | 158.72 |

UNIT: mm

OPTICAL SCANNING DEVICE, METHOD OF ADJUSTING THE SAME, AND IMAGE FORMING APPARATUS

CROSS-REFERENCE TO RELATED APPLICATIONS

The present application claims priority to and incorporates by reference the entire contents of Japanese Patent Application No. 2008-266938 filed in Japan on Oct. 16, 2008.

BACKGROUND OF THE INVENTION

1. Field of the Invention

The present invention relates to an optical scanning device and a method of adjusting the optical scanning device, and more particularly, to an optical scanning device that scans a target surface with a light beam, a method of adjusting a lateral magnification and a focal position of an optical system included in the optical scanning device in a sub-scanning direction, and an image forming apparatus that includes the optical scanning device.

2. Description of the Related Art

In recent years, in the field of image forming apparatuses, such as laser printers and digital copying machines, improvements in printing speed (speeding up) and scanning density (high-quality images) have been required. In response to these requirements, methods of scanning a target surface with a plurality of light beams using a multi-beam light source that can emit multiple light beams have been developed. As a result, various types of scanning optical systems that can operate with multiple light beams have been accordingly proposed.

Japanese Patent No. 3445050 discloses a multi-beam scanning optical system. In the multi-beam scanning optical system, a variation in F-number determined by an image height produced by a light beam incident on a target surface in the sub-scanning direction is reduced by sequentially varying, from on-axis toward off-axis, curvatures of both surfaces of a single lens in the sub-scanning direction.

Japanese Patent No. 3768734 discloses an optical scanning device that includes at least two scanning imaging lenses. The scanning imaging lenses have at least two special surfaces in which the curvature in the sub-scanning direction varies from the optical axis toward peripheral regions in the main-scanning direction. At least one surface of the special surfaces has a property in which a variation of curvature in the sub-scanning direction is asymmetrical with respect to the main-scanning direction and the curvature in the sub-scanning direction has a plurality of extreme values.

Japanese Patent Application Laid-open No. 2005-338865 discloses a scanning optical device that includes two lenses. By sequentially varying, from on-axis toward off-axis, curvatures of the surfaces of the two lenses in the sub-scanning direction, the position of the principal plane in the sub-scanning direction is made closer to a target surface in the optical-axis direction compared with a position thereof in the off-axis direction. Accordingly, in the scanning optical device, variation in the value of the F-number determined by the image height produced by a light beam incident on a target surface in the sub-scanning direction is reduced.

Japanese Patent Application Laid-open No. 2002-287055 discloses an optical scanning device that includes a light source and a deflector. The light source includes a plurality of light-emitting elements that are two-dimensionally arrayed. The light-emitting elements are used for scanning an identical or different scanning line. The deflector deflects multiple light beams emitted from the light source in the main-scanning direction at the same time. In the optical scanning device, the light source is made to rotate about the optical axis in such a manner that exposure energy distribution in the sub-scanning direction produced by light beams in an identical scanning region is substantially equal to a desired exposure energy distribution.

Japanese Patent Application Laid-open No. 2000-9994 discloses a collimator lens that includes a first lens and a second lens that are arranged in this order on the collimated light-beam side. The first lens has a concave surface on the collimated light-beam side and the second lens has a positive refractive power. At least one of the surfaces of the first lens is an aspheric surface.

When performing high density scanning, it is advantageous to use a light source, such as a surface emitting laser array, in which a plurality of light-emitting elements is two-dimensionally arrayed in high density.

Using a light source that includes a one-dimensional array in which a plurality of light emitting elements are arranged one dimensionally, it is possible to simultaneously adjust intervals of the light-emitting element in the sub-scanning direction by rotating the light source about an axis parallel to the light emitting direction (gamma rotation), whereby scanning-line intervals on the target surface can be made uniform. In this specification, the term "interval of the light-emitting element" refers to the distance between the centers of two neighboring light-emitting elements.

The problem is that when performing gamma rotation using the light source in which the light-emitting elements are two-dimensionally arrayed, the intervals of the light-emitting element varies (see FIG. 24). This makes it difficult to perform precise adjustment of the scanning-line intervals on the target surface in a uniform manner. This problem should be addressed in order to improve image quality that may be further required in the future.

SUMMARY OF THE INVENTION

It is an object of the present invention to at least partially solve the problems in the conventional technology.

According to one aspect of the present invention, there is provided an optical scanning device that scans a target surface with a light beam in a main-scanning direction. The optical scanning device includes: a light source that includes a plurality of light-emitting elements arranged in a two-dimensional array; a coupling optical system that couples a light beam emitted from the light source, which includes a first optical element having a positive power and a second optical element that has a negative power and that receives the light beam passed through the first optical element, an incident surface and an output surface of the second optical element being concave, an absolute value of a paraxial curvature radius of the incident surface being larger than that of the output surface; a deflector that deflects the light beam passed through the coupling optical system; and a scanning optical system that focuses the light beam deflected by the deflector on the target surface.

Furthermore, according to another aspect of the present invention, there is provided a method of adjusting a lateral magnification and a focal position of an entire optical system of an optical scanning device in a direction corresponding to a sub-scanning direction. The optical scanning device includes a light source that includes a plurality of light-emitting elements arranged in a two-dimensional array, a coupling optical system that couples a light beam emitted from the light source, which includes a first optical element having a positive power and a second optical element that has a negative power and that receives the light beam passed through the first optical element, an incident surface and an output surface of the second optical element being concave, an absolute value of a paraxial curvature radius of the incident surface being larger than that of the output surface, a deflector that deflects the light beam passed through the coupling optical system, and a scanning optical system that focuses the light beam deflected by the deflector on the target surface. A distance between the first optical element and the second optical element is adjusted in such a manner that a lateral magnification of the entire optical system including the coupling optical system and the scanning optical system in a sub-scanning direction is set to a desired value. A material of the first optical element differs from a material of the second optical element. The coupling optical system reduces a variation of focal position of the entire optical system due to a temperature change. The method includes: irradiating an evaluation image plane corresponding to the target surface with the light beam emitted from the light source; adjusting the distance between the first optical element and the second optical element in such a manner that a beam pitch on the evaluation image plane is set to a desired value; and moving the first optical element and the second optical element in an optical axis direction in such a manner that the light beam emitted from the light source is focused on the evaluation image plane, while maintaining the distance between the first optical element and the second optical element.

Moreover, according to still another aspect of the present invention, there is provided a method of adjusting a lateral magnification and a focal position of an entire optical system of an optical scanning device in a direction corresponding to a sub-scanning direction. The optical scanning device includes a light source that includes a plurality of light-emitting elements arranged in a two-dimensional array, a coupling optical system that couples a light beam emitted from the light source, which includes a first optical element having a positive power and a second optical element that has a negative power and that receives the light beam passed through the first optical element, an incident surface and an output surface of the second optical element being concave, an absolute value of a paraxial curvature radius of the incident surface being larger than that of the output surface, a deflector that deflects the light beam passed through the coupling optical system, and a scanning optical system that focuses the light beam deflected by the deflector on the target surface. A distance between the first optical element and the second optical element is adjusted in such a manner that a lateral magnification of the entire optical system including the coupling optical system and the scanning optical system in a sub-scanning direction is set to a desired value. A material of the first optical element differs from a material of the second optical element. The coupling optical system reduces a variation of focal position of the entire optical system due to a temperature change. The method includes: irradiating an evaluation image plane corresponding to the target surface with the light beam emitted from the light source; moving the first optical element in an optical axis direction in such a manner that the light beam emitted from the light source is focused on the evaluation image plane; and moving the second optical element in the optical axis direction in such a manner that a beam pitch on the evaluation image plane reaches a desired value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a table for explaining a shape of a cylindrical lens;

FIG. 11 is a table for explaining a shape of a scanning lens at a deflector side;

FIG. 12 is table for explaining a shape of the scanning lens at an image plane side;

FIG. 16 is a schematic diagram for explaining a modification of the adjustment method of the coupling optical system;

FIGS. 17A and 17B are schematic diagrams for explaining a modification of the adjustment method of the coupling optical system;

FIGS. 18 and 19 are tables for explaining a modification of the coupling optical system;

FIGS. 20 and 21 are tables for explaining a modification of the scanning optical system;

FIG. 22 is a table for explaining a positional relation among the main optical elements of a modification of a scanning optical system;

DETAILED DESCRIPTION OF THE PREFERRED EMBODIMENTS

Figure 1:
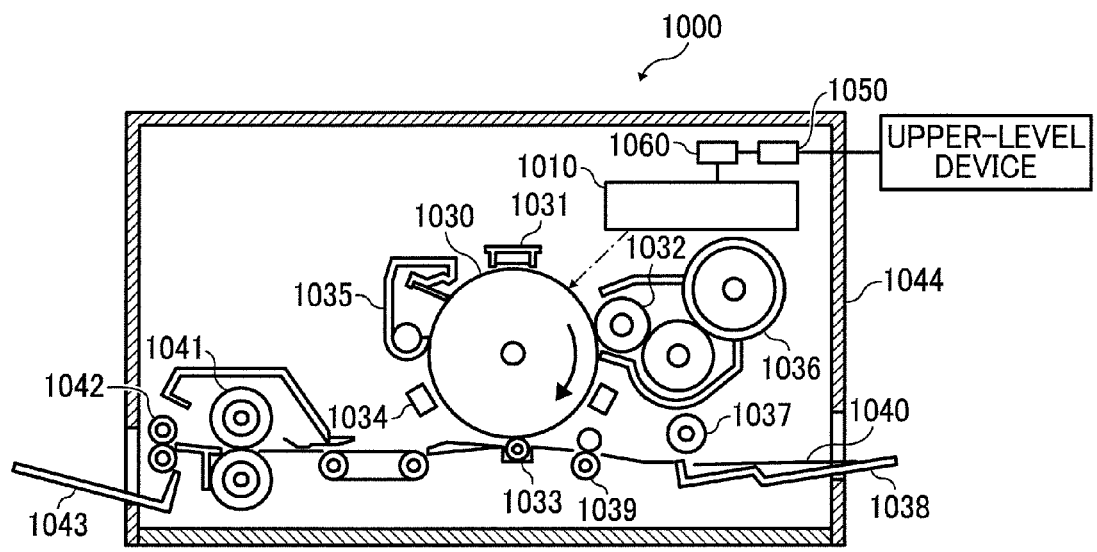
FIG. 1 is a side view of an internal configuration of a laser printer according to an embodiment of the present invention.

Exemplary embodiments of the present invention are described in detail below with reference to the accompanying drawings. FIG. 1 is a side view of an internal configuration of a laser printer 1000 serving as an image forming apparatus according to an embodiment of the present invention.

The laser printer 1000 includes an optical scanning device 1010, a photosensitive element 1030, an electric charger 1031, a developing roller 1032, a transfer charger 1033, a decharging unit 1034, a cleaning unit 1035, a toner cartridge 1036, a feeding roller 1037, a feeding tray 1038, a pair of registration rollers 1039, a pair of fixing rollers 1041, a pair of discharging rollers 1042, a discharge tray 1043, a communication control unit 1050, and a printer control device 1060 that controls all the components described above. The components are arranged at a predetermined position in a printer housing 1044.

The communication control unit 1050 controls a two-way communication with an upper-level device, for example a personal computer, via a network.

The photosensitive element 1030 is a cylindrical member having a photosensitive layer on its surface. The surface of the photosensitive element 1030 is the target of optical scanning. The photosensitive element 1030 is rotated in the direction indicated by an arrow in FIG. 1.

The electric charger 1031, the developing roller 1032, the transfer charger 1033, the decharging unit 1034, and the cleaning unit 1035 are arranged in this order near a surface of the photosensitive element 1030 along the rotation direction of the photosensitive element 1030.

The electric charger 1031 uniformly charges the surface of the photosensitive element 1030.

The optical scanning device 1010 scans the surface of the photosensitive element 1030, which is charged by the electric charger 1031, with a light beam that is modulated based on image information received from the upper-level device and forms a latent image corresponding to the image information on the surface of the photosensitive element 1030. The latent image formed in this way moves toward the developing roller 1032 with a rotation of the photosensitive element 1030. The configuration of the optical scanning device 1010 is described later.

Toner is contained in the toner cartridge 1036 and supplied to the developing roller 1032.

The developing roller 1032 causes the toner supplied from the toner cartridge 1036 to adhere onto the latent image formed on the surface of the photosensitive element 1030, whereby the image information is made to be visible. The latent image (hereinafter, "toner image") on which the toner is adhered moves toward the transfer charger 1033 with the rotation of the photosensitive element 1030.

The feeding tray 1038 stores recording sheets 1040. The feeding roller 1037 is arranged near the feeding tray 1038. The feeding roller 1037 picks up the recording sheets 1040 one by one from the feeding tray 1038 and feeds the recording sheets 1040 to the registration rollers 1039. The registration rollers 1039 once retains the recording sheet 1040 that is picked up by the feeding roller 1037 and sends the recording sheet 1040 toward a nip between the photosensitive element 1030 and the transfer charger 1033 with a rotation of the photosensitive element 1030.

A voltage having an opposite polarity of the toner is applied to the transfer charger 1033 in such a manner that the toner adhering on the surface of the photosensitive element 1030 is electrically attracted to the recording sheet 1040. Using this voltage, the toner image on the photosensitive element 1030 is transferred onto the recording sheet 1040. The recording sheet 1040 with the toner image is conveyed to the fixing rollers 1041.

The fixing rollers 1041 apply heat and pressure to the recording sheet 1040, whereby toner of the toner image on the recording sheet 1040 is fixed to the recording sheet 1040. The recording sheet 1040 with the fixed toner image is conveyed to the discharge tray 1043 via the discharging rollers 1042 and stacked up on the discharge tray 1043 one by one.

The decharging unit 1034 decharges the surface of the photosensitive element 1030.

The cleaning unit 1035 cleans (removes or scraps) toner (residual toner) remaining on the surface of the photosensitive element 1030. The clean surface of the photosensitive element 1030 returns to the position opposing to the electric charger 1031.

The configuration of the optical scanning device 1010 is described next.

Figure 2:
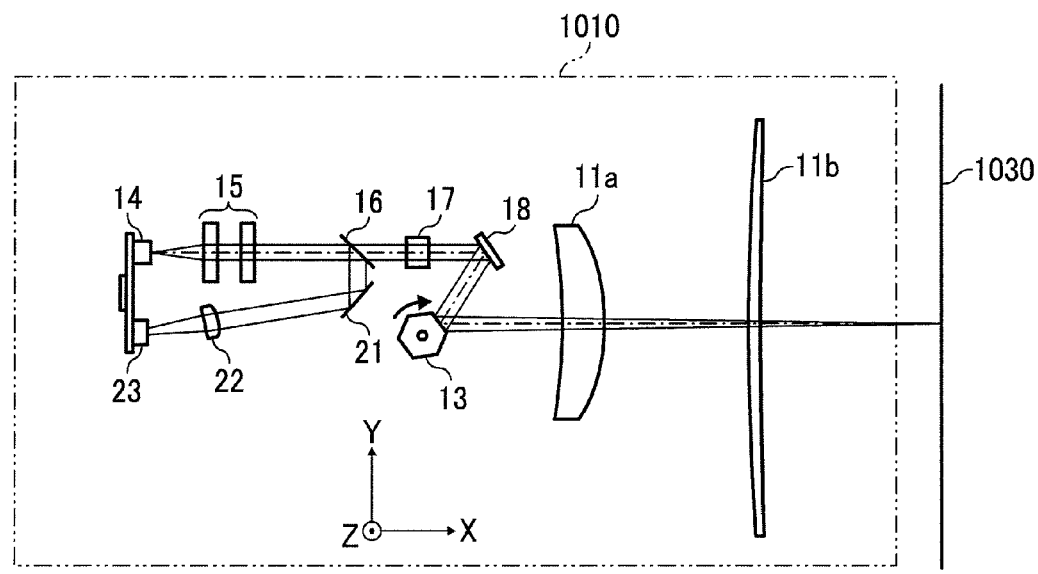
FIG. 2 is a schematic diagram of an exemplary configuration of an optical scanning device illustrated in FIG. 1.

As shown in FIG. 2, the optical scanning device 1010 includes a light source 14, a coupling optical system 15, an aperture plate 16, a cylindrical lens 17, a reflecting mirror 18, a polygon mirror 13, a polygon motor (not shown) that rotates the polygon mirror 13, a deflector-side scanning lens 11*a*, an image-plane-side scanning lens 11*b*, a monitoring-light reflecting mirror 21, a focusing lens 22, a light receiving element 23, a scanning control device (not shown), and a housing in a substantially rectangular block shape (not shown) that accommodates the components described above.

The scanning control device includes a driving circuit that drives the light source 14. The driving circuit, the light source 14, and the light receiving element 23 are mounted on a single circuit board.

In this specification, the direction parallel to the axis of rotation of the photosensitive element 1030 represents Y-axis direction and the direction parallel to an optical axis of the scanning lens 11 (i.e., 11*a*, 11*b*) represents X-axis direction of the XYZ three-dimensional orthogonal coordinate system. For convenience of explanation, the direction corresponding to the main-scanning direction is referred to as the "main-scanning direction" and the direction corresponding to the sub-scanning direction is referred to as the "sub-scanning direction".

Figure 3:
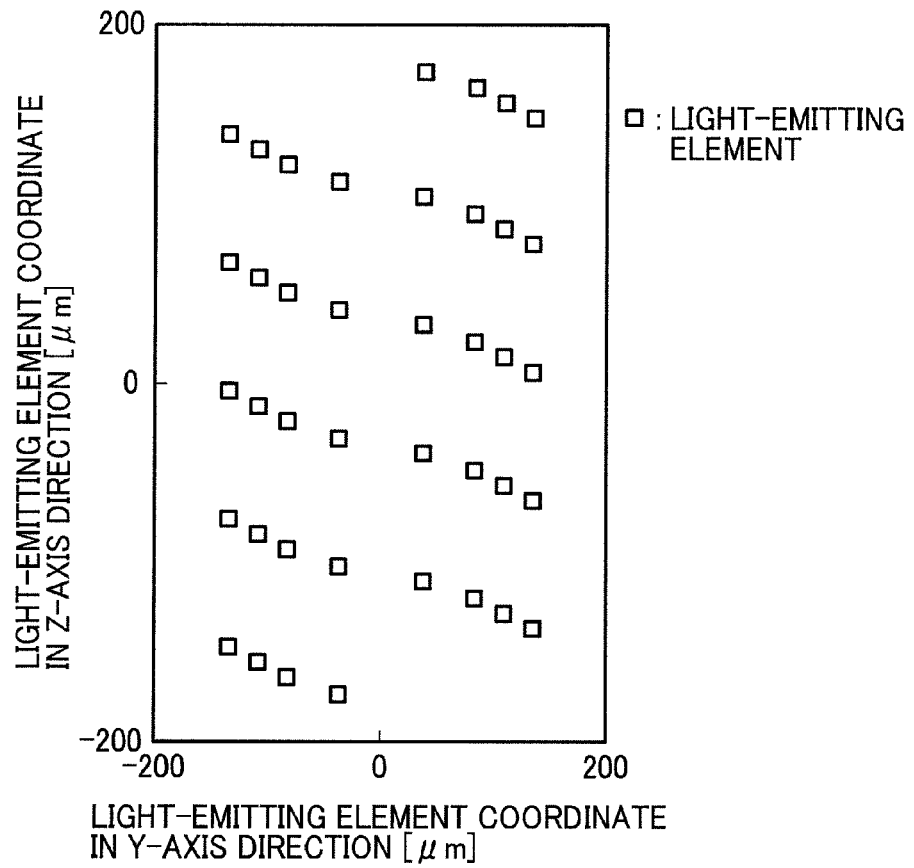
FIG. 3 is a plan view of a light source.

As shown in FIG. 3, the light source 14 includes 40 light-emitting elements arranged on a single substrate. Each of the light-emitting elements is a vertical cavity surface emitting Laser (VCSEL) with a wavelength band of 782 nanometers. The light-emitting elements emit light beams toward the +X direction. The VCSELs have a property in which a discontinuous change in wavelength (wavelength jump) does not theoretically occur because temperature variation of the oscillated wavelength is small.

Referring back to FIG. 2, the coupling optical system 15 substantially collimates the light beam emitted from the light source 14.

Figure 4:
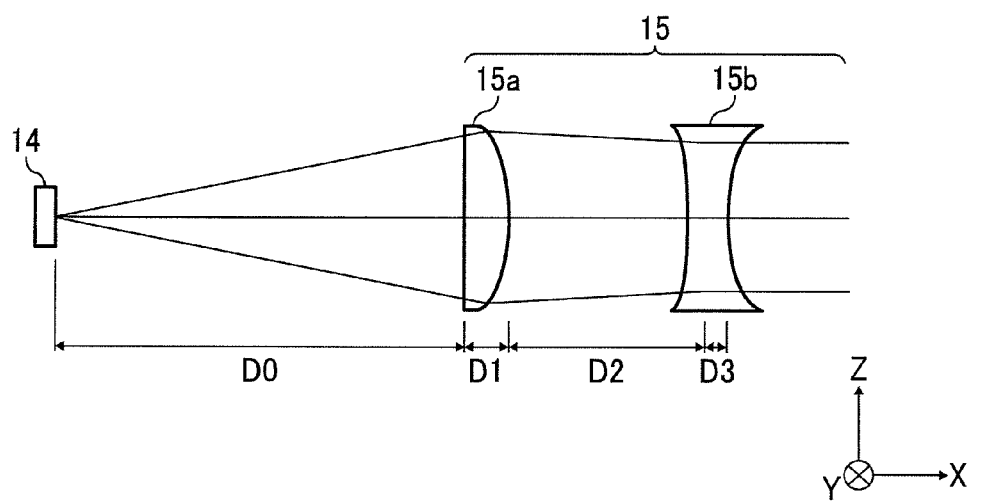
FIG. 4 is a schematic diagram of an exemplary configuration of a coupling optical system.

As shown in FIG. 4 as an example, the coupling optical system 15 includes a first lens 15*a* and a second lens 15*b*.

Figures 5, 6, 7:
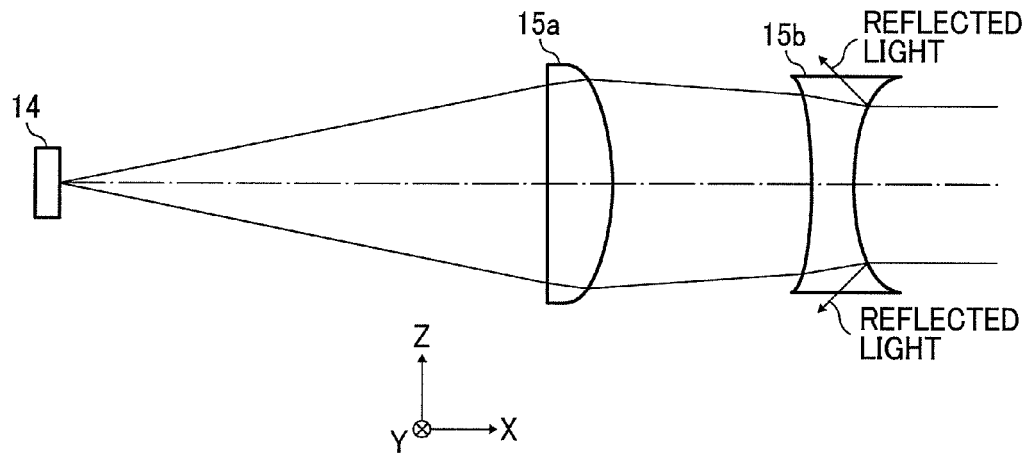
FIG. 5 is a table for explaining shapes of a first lens and a second lens of the coupling optical system.
FIG. 6 is a table for explaining a light emitting surface of the second lens.
FIG. 7 is a schematic diagram for explaining the light emitting surface of the second lens.

The first lens 15*a* is made of glass and has a positive power. The first lens 15*a* has a plane surface on the −X side (light incident surface) and a convex surface on the +X side (light emitting surface). Specifically, as shown in FIG. 5, the paraxial curvature radius $R_y$ of the light emitting surface of the first lens 15*a* in the main-scanning direction (Y-axis direction in this example) and a paraxial curvature radius $R_z$ of the light emitting surface of the first lens 15*a* in the sub-scanning direction (Z-axis direction in this example) are both −21.131 millimeters (mm). The paraxial curvature radii $R_y$ and $R_z$ of the light incident surface of the first lens 15*a* in the main-scanning direction and in the sub-scanning direction are both infinite.

A refractive index n of the first lens 15*a* is 1.5111. The central thickness of the first lens 15*a* (reference symbol D1 in FIG. 4) is 5 mm. A power P (1/focal length f) of the first lens 15*a* is $2.42 \times 10^{-2}$.

The second lens 15*b* is made of resin and has a negative power. The second lens 15*b* has concave surfaces on both surfaces, i.e., the light incident surface and the light emitting surface. Specifically, as shown in FIG. 5, the paraxial curvature radii $R_y$ and $R_z$ of the light incident surface of the second lens 15*b* (surface on the −X side) are both −475 mm. The paraxial curvature radii $R_y$ and $R_z$ of the light emitting surface of the second lens 15b (surface on the +X side) are both 300 mm.

A refractive index n of the second lens 15b is 1.5239. The central thickness of the second lens 15b (reference symbol D3 in FIG. 4) is 2 mm. The power P of the second lens 15b is $-2.85 \times 10^{-3}$.

In other words, an absolute value of the power P of the first lens 15a is larger than that of the second lens 15b.

The light emitting surface of the second lens 15b is a special toroidal surface. The special toroidal surface has a property in which a curvature in the sub-scanning direction (Z-axis direction in this example) varies according to a height of the lens in the main-scanning direction (Y-axis direction in this example). When $C_m=1/R_y$, the shape of the special toroidal surface is given by $$x(y,z) = \frac{y^2 \cdot C_m}{1+\sqrt{1-(1+K)\cdot(y\cdot C_m)^2}} + A_4 \cdot y^4 + A_6 \cdot y^6 + \quad (1)$$
$$A_8 \cdot y^8 + A_{10} \cdot y^{10} + A_{12} \cdot y^{12} + \frac{Cs(y) \cdot z^2}{1+\sqrt{1-(Cs(y)\cdot z)^2}}$$

$$Cs(y) = \frac{1}{R_z} + B_1 \cdot y + B_2 \cdot y^2 + B_3 \cdot y^3 + B_4 \cdot y^4 + B_5 \cdot y^5 + B_6 \cdot y^6 \quad (2)$$

where, x is a depth in the optical axis direction; y is a distance away from the optical axis in the main-scanning direction; z is a distance away from the optical axis in the sub-scanning direction; K is a constant of the cone; and $A_4, A_6, A_8, A_{10}, A_{12}, B_1, B_2$, and $B_3$ are coefficients.

The light emitting surface of the second lens 15b is a rotational-symmetrical aspheric surface. The aspheric surface used for the second lens 15b is given by $$x(H) = \frac{CH^2}{1+\sqrt{1-(1+K)\cdot C^2 H^2}} + A_4 \cdot H^4 + \quad (3)$$
$$A_6 \cdot H^6 + A_8 \cdot H^8 + A_{10} \cdot H^{10}$$

where, C is a reciprocal of a paraxial curvature radius (paraxial curvature), and H is a height from the optical axis.

Example data on the light emitting surface of the second lens 15b are shown in FIG. 6. In the main-scanning direction, the cross-sectional shape of the light emitting surface of the second lens 15b is a non-arc shape. In the sub-scanning direction, the cross-sectional shape of the light emitting surface of the second lens 15b is an arc shape.

It is difficult to precisely form a flat surface. However, in the embodiment, the light incident surface and the light emitting surface of the second lens 15b are both concave; therefore, formability can be improved.

The second lens 15b can be designed in a flexible manner in terms of aberration correction compared with a case where either the light incident surface or the light emitting surface of the second lens 15b is a flat surface.

The shape of the second lens 15b in the main-scanning direction needs to be non-arc in terms of aberration correction. In the embodiment, however, the light emitting surface of the second lens 15b, which has a large absolute value of the curvature in the main-scanning direction, is a non-arc shape. Accordingly, the area of the aspheric surface can be small, which makes it possible to easily produce the second lens 15b.

The second lens 15b satisfies $$|R1| > |R2| \quad (4)$$

where, R1 is a radius of curvature of the light incident surface (the same as the paraxial curvature radii $R_y$ and $R_z$ in this example), R2 is a radius of curvature of the light emitting surface (the same as the paraxial curvature radii $R_y$ and $R_z$ in this example).

Because the absolute value of the curvature is large on the light emitting surface where the light beam is substantially collimated compared with the light beam on the light incident surface, even when the light beam reflected by the light emitting surface, the light beam is less likely to return to the light source 14 (see FIG. 7). When the light beam return to the light source 14, it is difficult to control the light intensity in a stable manner; however, the light beam is less likely to return to the light source 14 in the embodiment, thus no such problem occurs.

The light source 14 and the coupling optical system 15 are arranged in a predetermined housing and serve as a light source unit LU.

Figure 8:
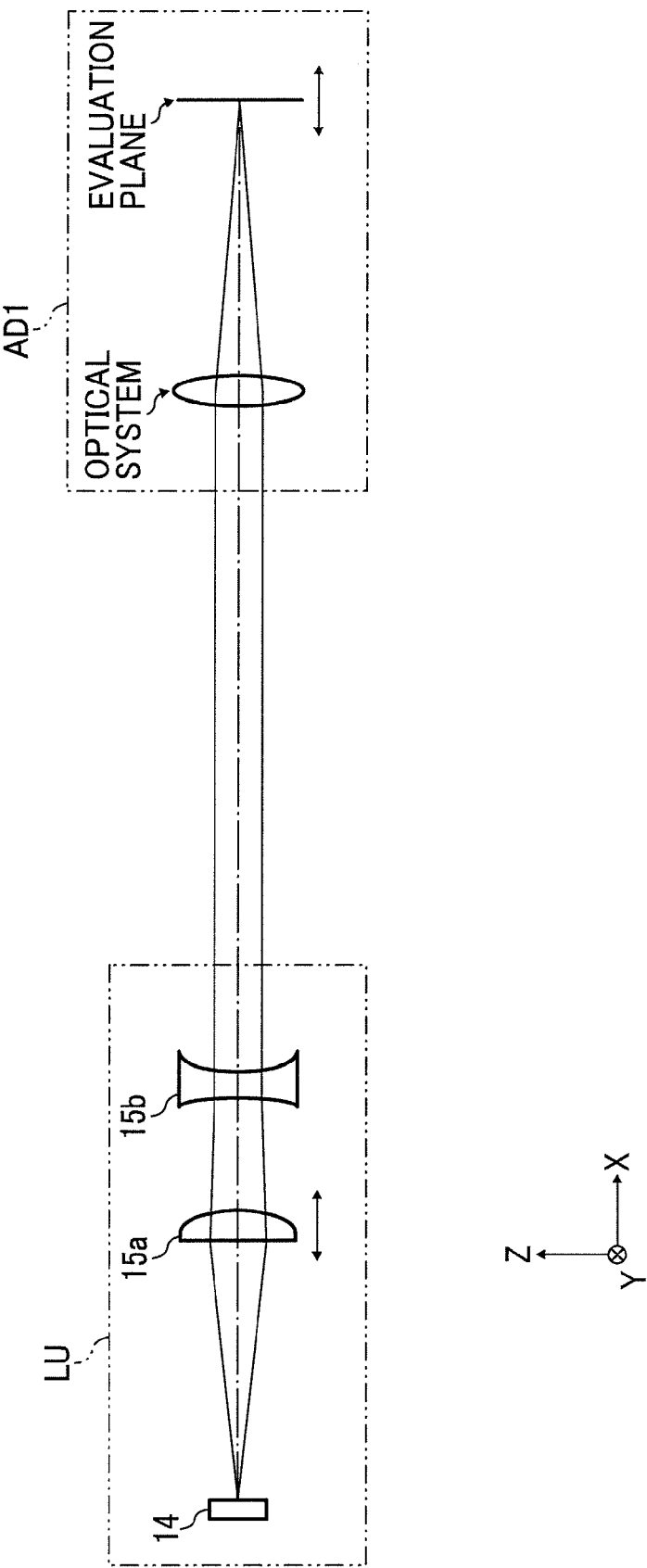
FIGS. 8 and 9 are schematic diagrams for explaining methods of adjusting the coupling optical system illustrated in FIG. 4.

A method of adjusting the coupling optical system 15 is described below:

1. The light source unit LU is arranged at a predetermined position with respect to a light-source-unit evaluation device AD1 (see FIG. 8).

2. Light beams are emitted from each of the light-emitting elements in the light source 14. The first lens 15a is moved in the X-axis direction in such a manner that the light beams are focused on an image plane to be evaluated (hereinafter, "evaluation plane") in the light-source-unit evaluation device AD1 (see FIG. 8). A focal length of the optical system in the light-source-unit evaluation device AD1 is 50 mm. With this configuration, the light beams are emitted from the light source unit LU in a desirable manner, whereby, when using the optical scanning device 1010, precise image formation on a target surface can be improved. In other words, an error in the entire optical system can be reduced a desired level or below.

Figure 9:
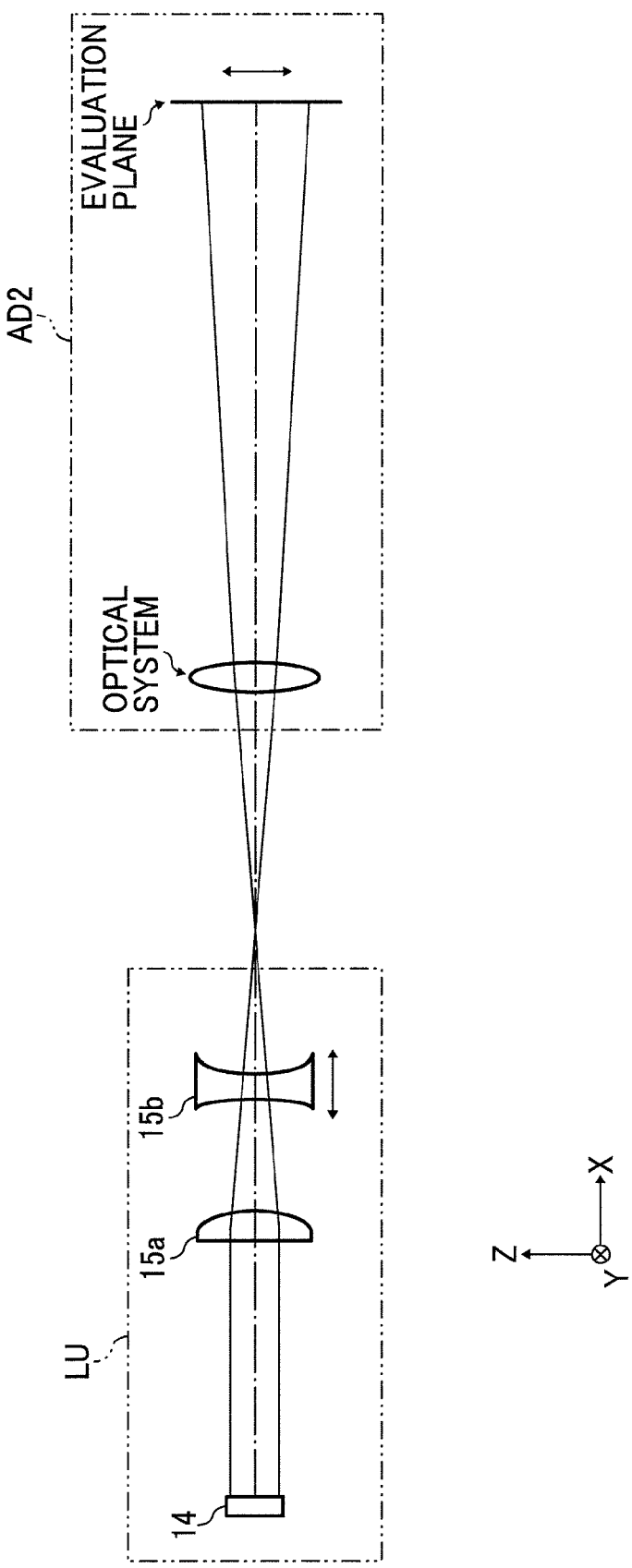

3. The light source unit LU is arranged at a predetermined position with respect to a light-source-unit evaluation device AD2 (see FIG. 9).

4. Light beams are emitted from each of the light-emitting element in the light source 14. The second lens 15b is moved in the X-axis direction in such a manner that a desired beam pitch on an evaluation plane in the light-source-unit evaluation device AD2 can be obtained (see FIG. 9). A focal length of the optical system in the light-source-unit evaluation device AD2 is 98.4 mm. A desired lateral magnification of the optical scanning device 1010 in the sub-scanning direction is 2 times. The second lens 15b is moved in the X-axis direction so that two light beams emitted from two different light-emitting elements that are arranged 393 micrometers (μm) away from the Z-axis direction form a beam pitch of 786 μm on the evaluation plane in the light-source-unit evaluation device AD2. In this manner, even when there are some errors, such as a manufacturing error, in the radii of curvature of the first lens 15a and the second lens 15b, a desired value of a combined focal length (45.0 mm in this example) of the coupling optical system 15 can be obtained. This makes it possible to reduce an error in scanning-line intervals on a target surface when using the optical scanning device 1010. In other words, a lateral magnification error of the entire optical system in the sub-scanning direction can be reduced a desired level or below.

When the position of the second lens 15b is adjusted, a focal position of the entire optical system may be changed; however, a change in the focal position is extremely small because the absolute value of the power of the first lens 15a is larger than that of the second lens 15b.

5. The first lens 15a and the second lens 15b are firmly bonded to a holding member (not shown) with an adhesive.

Specifically, the first lens 15a and the second lens 15b can be firmly bonded to the holding member such that, for example, an ultraviolet curing resin is applied to each of bonding surfaces of the first lens 15a and the second lens 15b in advance, and the ultraviolet curing resin is irradiated with ultraviolet rays after determining positions of the first lens 15a and the second lens 15b. In this case, high-accurate positional alignment can be obtained even when manufacturing steps are simplified.

In this example, a distance between the light source 14 and the first lens 15a (reference symbol D0 in FIG. 4) is 43.7 mm. A distance between the first lens 15a and the second lens 15b (reference symbol D2 in FIG. 4) is 12.0 mm.

The light source unit LU adjusted in this way is arranged at a predetermined position in the housing (not shown) in the optical scanning device.

The holding member that holds the first lens 15a and the second lens 15b with a predetermined positional relation and a holding member that holds the light source 14 are arranged as a single unit. Specifically, the light source 14, the first lens 15a, and the second lens 15b are held by the integrally arranged holding members, with their predetermined positional relations being maintained.

Referring back to FIG. 2, the aperture plate 16 has a rectangular or oval aperture. The width (front width) of the aperture in the main-scanning direction (Y-axis direction in this example) is 5.8 mm, and the width (front width) of the aperture in the sub-scanning direction (Z-axis direction in this example) is 1.18 mm. The aperture plate 16 shapes the beam diameter of the light beam passing through the coupling optical system 15. A reflecting, member is arranged around the aperture of the aperture plate 16.

To use the light beam reflected by the reflecting member arranged around the aperture as a monitoring light beam, the aperture plate 16 is arranged at an angle with respect to an imaginary plane perpendicular to the moving direction of the light beam that passes through the coupling optical system 15.

The monitoring-light reflecting mirror 21 is arranged in an optical path of the monitoring light beam that is reflected by the aperture plate 16. The monitoring-light reflecting mirror 21 reflects the monitoring light beam toward the light receiving element 23.

The focusing lens 22 is arranged in the optical path of the monitoring light beam that is reflected by the monitoring-light reflecting mirror 21 and focuses the monitoring light beam.

The light receiving element 23 outputs a signal (photoelectric conversion signal) according to an amount of light received.

The driving circuit of the scanning control device controls a driving signal of the light source 14 based on an output signal received from the light receiving element 23, i.e., perform an auto power control (APC).

The cylindrical lens 17 focuses the light beam passing through the aperture of the aperture plate 16 onto a deflecting reflection surface of the polygon mirror 13, via the reflecting mirror 18, in the sub-scanning direction (Z-axis direction in this example). As shown in FIG. 10, a paraxial curvature radius $R_y$ of the light incident surface of the cylindrical lens 17 is infinite, and a paraxial curvature radius $R_z$ thereof is 28.453 mm. The paraxial curvature radii $R_y$ and $R_z$ on the light emitting surface of the cylindrical lens 17 are both infinite. A refractive index n of the cylindrical lens 17 is 1.5111. The cylindrical lens 17 constitutes, together with the scanning lenses, an optical face tangle error correction system in the sub-scanning direction.

The optical system arranged in the optical path between the light source 14 and the polygon mirror 13 is called a pre-deflector optical system. In the embodiment, the pre-deflector optical system includes the coupling optical system 15, the aperture plate 16, the cylindrical lens 17, and the reflecting mirror 18.

The polygon mirror 13 is, for example, a hexagonal mirror having six side-faces, each side face serving as a deflecting reflection surface. The inscribed circle diameter of the polygon mirror 13 is 25 mm. The polygon mirror 13 deflects the light beam reflected by the reflecting mirror 18 while rotating at a constant speed about an axis parallel to the Z-axis direction.

The deflector-side scanning lens 11a is arranged in the optical path of the light beam deflected by the polygon mirror 13.

The image-plane-side scanning lens 11b is arranged in the optical path of the light beam passing through the deflector-side scanning lens 11a.

The light beam passing through the image-plane-side scanning lens 11b is focused on the surface of the photosensitive element 1030, and a light spot is formed thereon. The light spot moves in the longitudinal direction of the photosensitive element 1030 along with the rotation of the polygon mirror 13, so that the surface of the photosensitive element 1030 is scanned. The direction of movement of the light spot on the surface of the photosensitive element 1030 corresponds to the "main-scanning direction", and the direction perpendicular to the "main-scanning direction" corresponds to the "sub-scanning direction".

Both surfaces (light incident surface: a surface on the −X side and light emitting surface: a surface on the +X side) of the deflector-side scanning lens 11a and the image-plane-side scanning lens 11b are special toroidal surfaces. The shapes of the special toroidal surfaces can be given by Equations (1) and (2) above.

Example value of the paraxial curvature radius $R_y$ (Unit: mm), the paraxial curvature radius $R_z$ (unit: mm), and coefficients of both surfaces (light incident surface and light emitting surface) of scanning lens 11 (i.e., 11a, 11b) are shown in FIGS. 11 and 12.

The center thickness (in the optical axis) of the deflector-side scanning lens 11a is 14.00 mm, and the center thickness (in the optical axis) of the image-plane-side scanning lens 11b is 3.50 mm.

The optical path length between the light emitting surface of the deflector-side scanning lens 11a and the light incident surface of the image-plane-side scanning lens 11b is 89.34 mm. The optical path length between the light emitting surface of the image-plane-side scanning lens 11b and the surface of the photosensitive element 1030 is 144.47 mm.

The optical system that is arranged in the optical path between the polygon mirror 13 and the photosensitive element 1030 is called a scanning optical system. In the embodiment, the scanning optical system includes the deflector-side scanning lens 11a and the image-plane-side scanning lens 11b. At least one reflecting mirror can be arranged in one of the optical path between the deflector-side scanning lens 11a and the image-plane-side scanning lens 11b and the optical path between the image-plane-side scanning lens 11b and the photosensitive element 1030.

The lateral magnification of the scanning optical system in the sub-scanning direction is −0.99 times.

The length of an effective scanning area on the surface of the photosensitive element 1030 (scanning width in the main-scanning direction) is 328 mm. The field angle is 39.2 degrees.

Figures 13, 14:
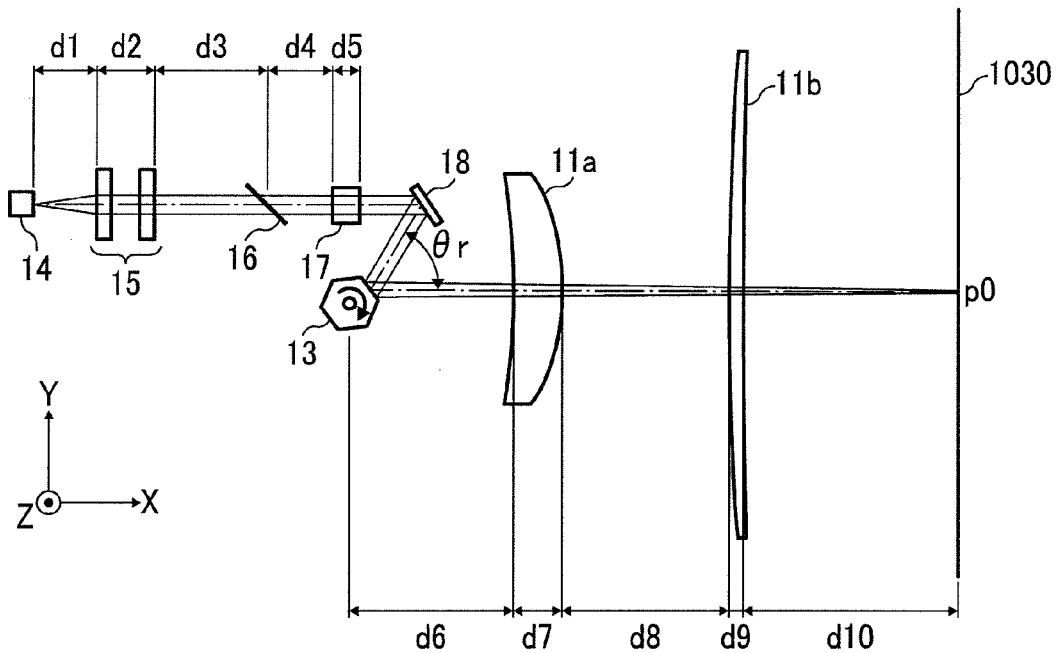
FIG. 13 is a schematic diagram of a positional relation among main optical elements of the optical scanning device.
FIG. 14 is a table for explaining a specific example of the positional relation among the main optical elements illustrated in FIG. 13.

The positional relation among the main optical elements of the pre-deflector optical system and the scanning optical system is shown in FIG. 13. Specific values (unit: mm) of reference symbols d1 to d10 in FIG. 13 are shown in FIG. 14 as an example.

An angle formed by the moving direction of the light beam from the reflecting mirror 18 toward the polygon mirror 13 and the moving direction of the light beam reflected from a deflecting reflection surface of the polygon mirror 13 toward a position of an image height O (a position indicated by reference symbol pO in FIG. 13) on the surface of the photosensitive element 1030 is 64 degrees (angle θr in FIG. 13).

As described above, in the optical scanning device 1010 according to the embodiment, the coupling optical system 15 is configured such that a lateral-magnification error and a focal-position error of the entire optical system in the sub-scanning direction can be reduced.

The coupling optical system is adjusted according to the above mentioned method of adjusting the coupling optical system.

The optical scanning device 1010 according to the embodiment includes the light source 14 in which a plurality of light-emitting elements are two-dimensionally arrayed; the pre-deflector optical system that includes the coupling optical system 15 arranged in the optical path of the light beam emitted from the light source 14; the polygon mirror 13 that deflects the light beam from the pre-deflector optical system; and the scanning optical system that focuses the light beam from the polygon mirror 13 onto the surface of the photosensitive element 1030.

The coupling optical system 15 includes the first lens 15a with positive power and the second lens 15b with negative power. The second lens 15b receives the light beam passing through the first lens 15a and has concave surfaces on both surfaces, i.e., the light incident surface and the light emitting surface.

In the coupling optical system including two lenses, a type of a second lens can be a plano-concave lens, a biconcave lens, a concave-plano lens, and a meniscus lens.

If a concave-plano lens is used for the second lens, the light beam reflected by the light emitting surface tends to return to the light source 14. If a plano-concave lens is used for the second lens, it is difficult to produce a flat surface, which causes a problem in terms of identifying whether the error is on the plus side or the minus side.

When the VCSELs, in which a plurality of light-emitting elements is two-dimensionally arrayed, are used as a light source, a relatively large effective diameter is required for a lens. In such a case, to reduce a variation of each of the incident angles of the light beams, the radii of curvature of the light incident surfaces are preferably made to increase. To reduce an effect of relative eccentricity between the light incident surface and the light emitting surface, the radii of curvature of each of the surfaces are preferably made large. However, when using a meniscus lens, the radius of curvature of the light emitting surface has to be reduced when increasing the radius of curvature of the light incident surface. Specifically, to reduce the variation of each of the incident angles of the light beams, the effect of relative eccentricity disadvantageously becomes large.

Because the biconcave lens is used for the second lens 15b according to the embodiment, it is possible to reduce a variation of each of the incident angles of the light beams and the effect of relative eccentricity between the light incident surface and the light emitting surface.

In this manner, formability of the second lens 15b can be improved compared to a case in which either the light incident surface or the light emitting surface is a flat surface. In addition, the second lens 15b is designed in a flexible manner in terms of aberration correction compared to a case in which either the light incident surface or the light emitting surface is a flat surface.

Furthermore, it is possible to prevent the light beam reflected by the light incident surface and the light emitting surface of the second lens 15b from returning to the light source 14. Accordingly, intervals of scanning lines on the surface of the photosensitive element 1030 can be precisely uniform without using expensive optical elements. As a result, scanning performance using a plurality of light beams is possible without increasing costs.

Figure 15:
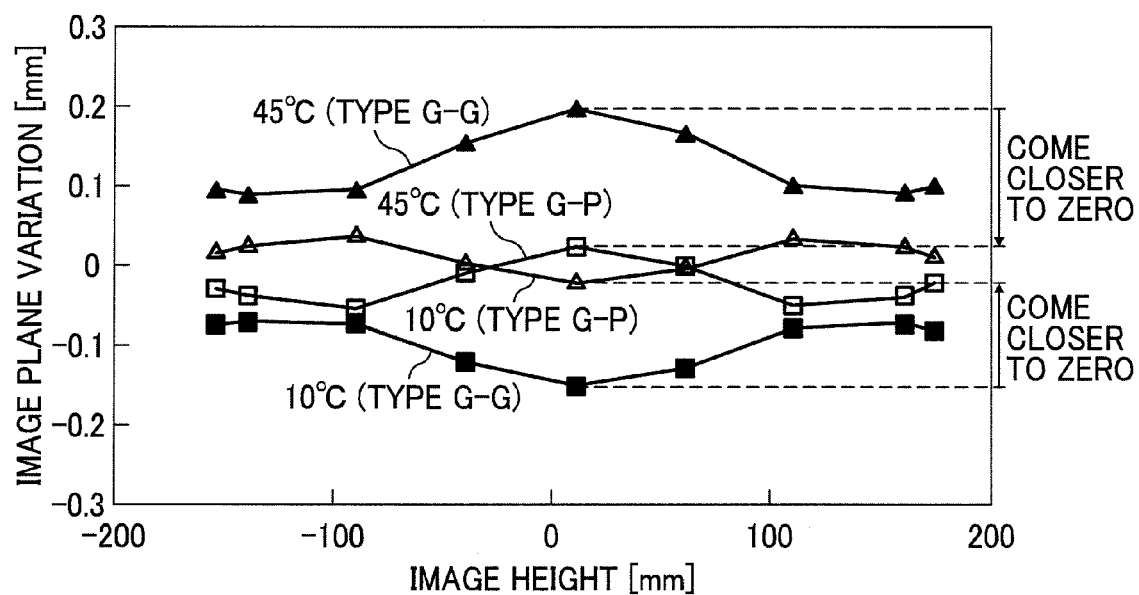
FIG. 15 is a graph for explaining a shifting amount of the image plane due to a change in temperature.

The coupling optical system 15 is a type G-P, i.e., the first lens 15a is made of glass and the second lens 15b is made of resin. As it is clear from FIG. 15, when compared with a type G-G, i.e., a case when both lenses are made of glass, a variation of focal position of the entire optical system due to a temperature change can be reduced.

The light incident surface of the first lens 15a is a flat surface and the light emitting surface thereof is a spherical surface. Because the first lens 15a has such a simple surface structure, processing of the first lens 15a can be precisely performed even when it is made of glass.

Because the second lens 15b is made of resin, the second lens 15b can be easily and precisely manufactured at low cost using a common molding method, such as injection molding.

Accordingly, high-precision lens can be used for both the first lens 15a and the second lens 15b at low cost.

The absolute value of the power of the second lens 15b is smaller than that of the first lens 15a. Therefore, formability of the second lens 15b can be further improved.

The light source 14, the first lens 15a, and the second lens 15b are held by the holding member with a predetermined positional relation; therefore, assembling steps can be simplified. The positional relation among the light source 14, the first lens 15a, and the second lens 15b is precisely adjusted before other optical elements are assembled, whereby the adjustment steps can be simplified. This makes it possible to reduce manufacturing costs.

Because the light source 14, the first lens 15a, and the second lens 15b are held by the holding member as a single unit, positional shifts due to assembly error or temperature change can be reduced. As a result, it is possible to further reduce variation of optical properties (particularly, focal position) and light beam intervals.

In the direction in which the aperture width (front width) of the aperture plate 16 is large (in the main-scanning direction in this example), the cross-sectional shape of the light emitting surface of the second lens 15b is a non-arc shape. In the direction in which the aperture width (front width) of the aperture plate 16 is small (in the sub-scanning direction in this example), the cross-sectional shape of the light emitting surface of the second lens 15b is an arc shape. In such a case, manufacturing and detection processing of the second lens 15b can be easily performed.

The paraxial curvature radii $R_y$ and $R_z$ of the light incident surface and the light emitting surface of the second lens 15b are equal. Accordingly, an effect (sensitivity) of a shift (eccentricity) in the optical axis of the first lens 15a and the optical axis of the second lens 15b can be reduced.

The light source 14 has the VCSELs in which a plurality of light-emitting element is two-dimensionally arrayed. The first lens 15a and the second lens 15b are positionally aligned in the direction parallel to the light emitting direction of the light beam in such a manner that the combined focal length of the first lens 15a and the second lens 15b is a desired focal length. This makes it possible to easily reduce the variation of the spot diameter of the plurality of the light spots and intervals of the scanning lines on the surface of the photosensitive element 1030.

In the embodiment, the light source unit LU does not include a positional determining portion that indicates an assembling position of the first lens 15a and the second lens 15b because the first lens 15a and the second lens 15b are bonded to a holding member 25 after adjustment. This simplifies the structure of the light source unit LU, thus reducing manufacturing costs and the footprint. Furthermore, a large working space can be ensured during adjustment; therefore, more precise adjustment is possible.

The laser printer 1000 according to the embodiment includes the optical scanning device 1010 that can precisely scan a plurality of the light beams without increasing manufacturing costs; therefore, it is possible to form a high-quality image without increasing manufacturing costs.

In the above explanation, it has been mentioned that the light source 14, the first lens 15a, and the second lens 15b are positionally aligned before assembling other optical elements; however, the configuration is not limited thereto. For example, the light source 14, the first lens 15a, and the second lens 15b are positionally aligned after assembling other optical elements. This makes it possible to cancel out errors in manufacturing and assembling the optical systems.

In the above explanation, it has been mentioned the method of adjusting the coupling optical system; however, the configuration is not limited thereto. For example, as shown in FIG. 16, the light beam emitted from the light source unit LU can be divided into two by, for example, a half mirror in such a manner that one of the light beam is made incident on the light-source-unit evaluation device AD1 and the other light beam is made incident on the light-source-unit evaluation device AD2.

In the above explanation about adjustment of the coupling optical system, it has been mentioned that the lateral magnification in the sub-scanning direction is adjusted after adjusting the focal position; however, the configuration is not limited thereto. For example, as shown in FIG. 17A, a distance between the first lens 15a and the second lens 15b (corresponding to reference symbol D2 in FIG. 4) can be adjusted in such a manner that the beam pitch on the evaluation plane of the light-source-unit evaluation device AD2 is a desired value, and then, as shown in FIG. 17B, the coupling optical system 15 can be moved in the X-axis direction, while maintaining the distance D2, so that the light beams are focused on the evaluation plane of the light-source-unit evaluation device AD1.

In such a case, when moving the coupling optical system 15, the lateral magnification in the sub-scanning direction may vary. However, the variation in the lateral magnification in the sub-scanning direction is extremely small because the absolute value of the power of the first lens 15a is larger than that of the second lens 15b.

In the above explanation, it has been mentioned that the light source 14 has 40 light-emitting elements; however the configuration is not limited thereto, so long as a plurality of the light-emitting element are two-dimensionally arranged.

In the above explanation, it has been mentioned that the first lens 15a has a flat surface on the light incident side and a spherical surface on the light emitting side; however, the configuration is not limited thereto. For example, the first lens 15a can have a spherical surface on one of the light incident surface and the light emitting surface and have a flat surface on the other one thereof.

In the above explanation, it has been mentioned that, in the main-scanning direction, the cross-sectional shape of the light emitting surface of the second lens 15b is a non-arc shape and, in the sub-scanning direction, the cross-sectional shape of the light emitting surface of the second lens 15b is an arc shape; however the configuration is not limited thereto. For example, the second lens 15b having non-arc surfaces on both sides can be used.

The scanning lens 11 (i.e., 11a, 11b) can be made of resin to reduce manufacturing costs. When large temperature change is predicted, a diffraction grating can be arranged on at least one of the optical surfaces of the scanning lens 11 to reduce the effect due to temperature variation.

The configuration of the optical systems that is used in the embodiment is described as an example and is not limited to a particular configuration.

FIG. 18 is a table for explaining a modification of the coupling optical system 15. In this case, the light emitting surface of the second lens 15b is a special toroidal surface and aspheric surface coefficients thereof are represented in FIG. 19.

FIGS. 20 and 21 are tables for explaining a modification of the scanning optical system. The light incident surface of the deflector-side scanning lens 11a, and the light incident surface and the light emitting surface of the image-plane-side scanning lens 11b are special toroidal surfaces. The light emitting surface of the deflector-side scanning lens 11a is a rotational-symmetrical aspheric surface. The sub-scanning lateral magnification of the scanning optical system is −0.98 times.

FIG. 22 is a table of specific modification values (unit: mm) of reference symbols from d1 to d10 indicated in FIG. 13. The length of an effective scanning area on the surface of the photosensitive element 1030 (scanning width in the main-scanning direction) in this case is 300 mm. The field angle is 35.7 degrees, and an angle θr indicated in FIG. 13 is 58 degrees. The inscribed circle diameter of the polygon mirror 13 having six side-faces is 18 mm.

In the embodiment, the laser printer 1000 serves as an image forming apparatus; however the configuration is not limited thereto. For example, any image forming apparatus including the optical scanning device 1010 can be used to produce high-quality images.

An image forming apparatus that includes the optical scanning device 1010 and directly irradiates a medium, such as a sheet, on which a color image is produced with the laser beam can be used.

An image forming apparatus in which a silver halide film is used for an image carrying member can be used. The latent image, formed on the silver halide film by optical scanning, can be converted to a visible image by subjecting the silver halide film to a process equivalent to the developing process of a regular silver halide photographic process, and the visible image can be transferred to a printing sheet by a process equivalent to a printing process of the regular silver halide photographic process. Such an image forming apparatus can be used for a photoengraving device, a laser beam writing system that produces CT scan images, and the like.

Figure 23:
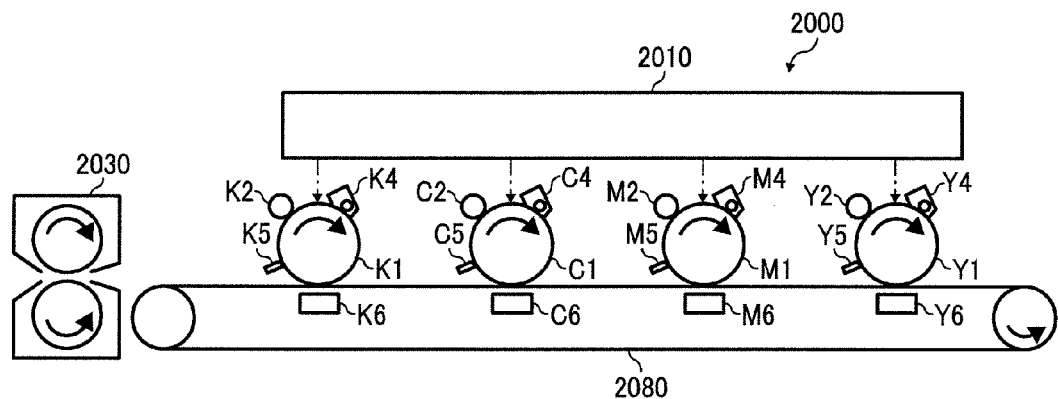
FIG. 23 is a schematic diagram of an exemplary configuration of a color printer.
Figure 24:
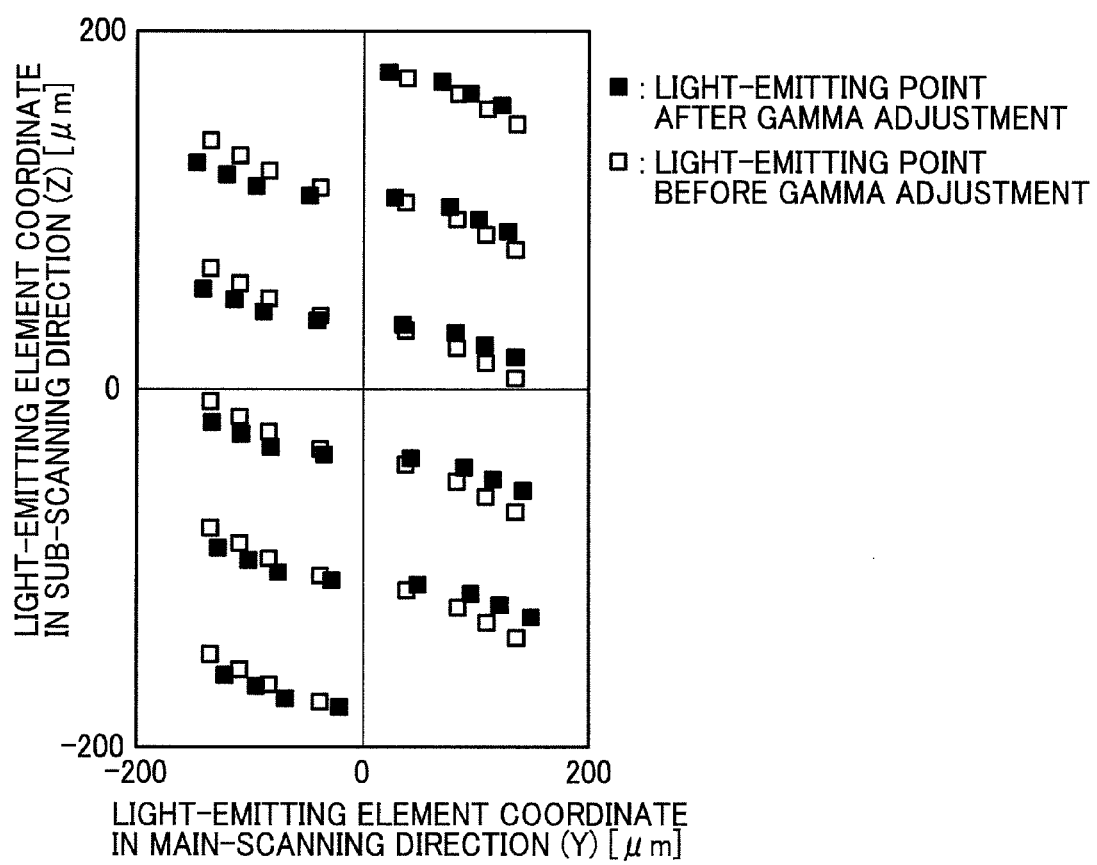
FIG. 24 is a schematic diagram for explaining adjustment performed by gamma rotation.

As shown in FIG. 23, a color printer 2000 including a plurality of photosensitive elements can be used.

The color printer 2000 is a tandem type multi-color printer that forms a full-color image by superimposing four colors (black, cyan, magenta, and yellow). The color printer 2000 includes four photosensitive elements (K1, C1, M1, and Y1), four electric chargers (K2, C2, M2, and Y2), four developing units (K4, C4, M4, and Y4), four cleaning units (K5, C5, M5, and Y5), and four transfer devices (K6, C6, M6, and Y6) for each of a black toner (K), a cyan toner (C), a magenta toner (M), and a yellow toner (Y). The color printer 2000 further includes an optical scanning device 2010, a transfer belt 2080, and a fixing unit 2030.

The photosensitive element rotates in the direction of an arrow in FIG. 23. Each set of the electric charger, the developing unit, the transfer device, the cleaning unit is arranged around the corresponding photosensitive element in this order along the rotation direction of the photosensitive elements. The electric charger uniformly charges a surface of a corresponding one of the photosensitive element. The optical scanning device 2010 irradiates an appropriate portion of the surface of each charged photosensitive element with a light beam and an electrostatic latent image is formed on the corresponding surface of the photosensitive element. A toner image is then formed on the corresponding photosensitive element by the corresponding developing unit. A transfer device transfers the toner image for each color onto the recording sheet that is conveyed onto the transfer belt 2080, and the fixing unit 2030 fixes the toner image onto the recording sheet.

The optical scanning device 2010 includes the same optical system that is included in the optical scanning device 1010 for each color; therefore, the same effect can be obtained in the case where the optical scanning device 1010 is used.

In the color printer 2000, the same effect can be obtained in the case where the laser printer 1000 is used.

When using the tandem type multi-color printer, color shift may occur for each color due to, for example, machine accuracy; however, correction accuracy can be improved by properly selecting light-emitting elements to be used.

In the color printer 2000, the optical scanning device can be arranged one for each color or one for each set of two colors.

According to an aspect of the present invention, an accurate scanning with a plurality of light beams can be performed without increasing manufacturing costs.

With a method of adjusting optical systems, it is possible to reduce errors in lateral-magnification and focal-position in the entire optical system in an optical scanning device in the sub-scanning direction.

Accordingly, the optical scanning device can produce high-quality images without increasing manufacturing costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a target surface with a light beam in a main-scanning direction, the optical scanning device comprising:
   a light source that includes a plurality of light-emitting elements arranged in a two-dimensional array;
   a coupling optical system that couples a light beam emitted from the light source, the coupling optical system including
      a first optical element having a positive power, and
      a second optical element that has a negative power and that receives the light beam passed through the first optical element, an incident surface and an output surface of the second optical element being concave, an absolute value of a paraxial curvature radius of the incident surface being larger than that of the output surface;
   a deflector that deflects the light beam passed through the coupling optical system; and
   a scanning optical system that focuses the light beam deflected by the deflector on the target surface.

2. The optical scanning device according to claim 1, wherein a distance between the first optical element and the second optical element is adjusted in such a manner that a lateral magnification of an entire optical system including the coupling optical system and the scanning optical system in a sub-scanning direction is set to a desired value.

3. The optical scanning device according to claim 2, wherein
   a, material of the first optical element differs from a material of the second optical element, and
   the coupling optical system reduces a variation of focal position of the entire optical system due to a temperature change.

4. The optical scanning device according to claim 1, wherein an absolute value of the power of the first optical element is larger than that of the second optical element.

5. The optical scanning device according to claim 1, further comprising an aperture member that is arranged in an optical path between the coupling optical system and the deflector and that includes an aperture whose width in a first direction is larger than that in a second direction perpendicular to the first direction, wherein
   the light emitting surface of the second optical element is a non-arc shape in cross section in the first direction.

6. The optical scanning device according to claim 5, wherein the first direction is the main-scanning direction.

7. The optical scanning device according to claim 5, further comprising a light receiving element that receives the light beam that is reflected by a portion of the aperture member surrounding the aperture.

8. The optical scanning device according to claim 1, wherein the light source and the coupling optical system are held by an integrated holding member with a predetermined positional relation therebetween.

9. The optical scanning device according to claim 1, wherein the light source is a surface emitting laser array in which the light-emitting elements are formed on a substrate.

10. An image forming apparatus comprising:
   at least one image carrier; and
   an optical scanning device according to claim 1, wherein
   the target surface is a surface of the image carrier, and
   the light beam is modulated based on image information.

11. The image forming apparatus according to claim 10, wherein the image information is color image information.

12. A method of adjusting a lateral magnification and a focal position of an entire optical system of an optical scanning device in a direction corresponding to a sub-scanning direction, wherein
   the optical scanning device that scans a target surface with a light beam in a main-scanning direction, the optical scanning device including
      a light source that includes a plurality of light-emitting elements arranged in a two-dimensional array,
      a coupling optical system that couples a light beam emitted from the light source, the coupling optical system including
         a first optical element having a positive power, and
         a second optical element that has a negative power and that receives the light beam passed through the first optical element, an incident surface and an output surface of the second optical element being concave, an absolute value of a paraxial curvature radius of the incident surface being larger than that of the output surface, a deflector that deflects the light beam passed through the coupling optical system, and a scanning optical system that focuses the light beam deflected by the deflector on the target surface, a distance between the first optical element and the second optical element is adjusted in such a manner that a lateral magnification of the entire optical system including the coupling optical system and the scanning optical system in a sub-scanning direction is set to a desired value, a material of the first optical element differs from a material of the second optical element, the coupling optical system reduces a variation of focal position of the entire optical system due to a temperature change, and the method comprises:

irradiating an evaluation image plane corresponding to the target surface with the light beam emitted from the light source;

adjusting the distance between the first optical element and the second optical element in such a manner that a beam pitch on the evaluation image plane is set to a desired value; and moving the first optical element and the second optical element in an optical axis direction in such a manner that the light beam emitted from the light source is focused on the evaluation image plane, while maintaining the distance between the first optical element and the second optical element.

13. A method of adjusting a lateral magnification and a focal position of an entire optical system of an optical scanning device in a direction corresponding to a sub-scanning direction, wherein the optical scanning device that scans a target surface with a light beam in a main-scanning direction, the optical scanning device including a light source that includes a plurality of light-emitting elements arranged in a two-dimensional array, a coupling optical system that couples a light beam emitted from the light source, the coupling optical system including a first optical element having a positive power, and a second optical element that has a negative power and that receives the light beam passed through the first optical element, an incident surface and an output surface of the second optical element being concave, an absolute value of a paraxial curvature radius of the incident surface being larger than that of the output surface, a deflector that deflects the light beam passed through the coupling optical system, and a scanning optical system that focuses the light beam deflected by the deflector on the target surface, a distance between the first optical element and the second optical element is adjusted in such a manner that a lateral magnification of the entire optical system including the coupling optical system and the scanning optical system in a sub-scanning direction is set to a desired value, a material of the first optical element differs from a material of the second optical element, the coupling optical system reduces a variation of focal position of the entire optical system due to a temperature change, and the method comprises:

irradiating an evaluation image plane corresponding to the target surface with the light beam emitted from the light source;

moving the first optical element in an optical axis direction in such a manner that the light beam emitted from the light source is focused on the evaluation image plane; and moving the second optical element in the optical axis direction in such a manner that a beam pitch on the evaluation image plane reaches a desired value.

* * * * *